Patented Jan. 4, 1938

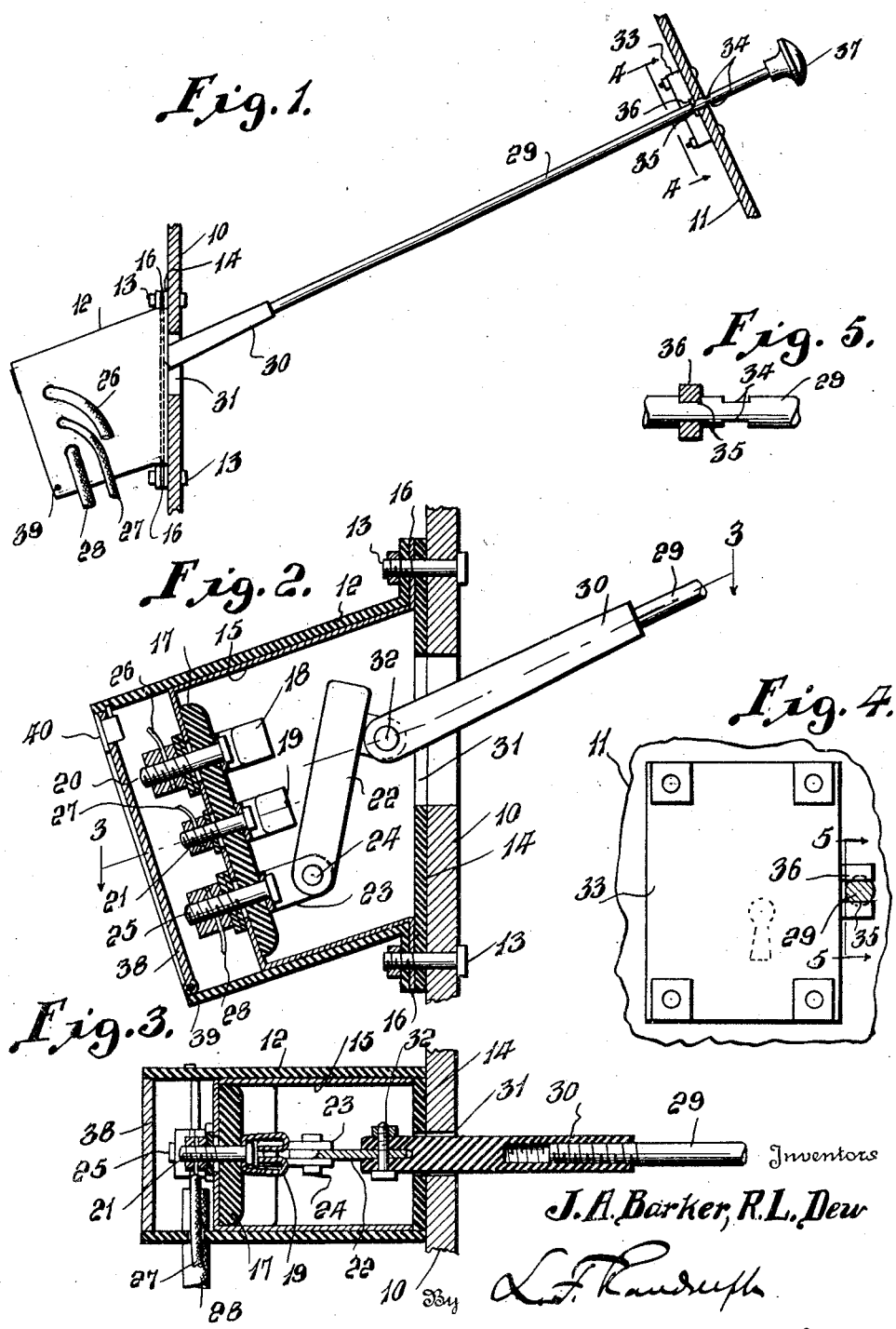

2,104,689

UNITED STATES PATENT OFFICE 2,104,689

AUTOMOBILE SAFETY SWITCH

John Abner Barker, Roseboro, and Robert Lee Dew, Clinton, N. C.

Application August 6, 1936, Serial No. 94,714

1 Claim. (Cl. 200—162)

This invention relates to a switch adapted to be used on motor vehicles whereby the ignition and lighting circuit will be open, with the exception of the circuit to the parking lamp, when desired by the owner, for the dual purposes of preventing stealing or unauthorized use of the vehicle and also to avoid the fire hazard incidental to short circuiting.

It is further aimed to provide a novel construction wherein the switch is mounted on the dashboard with the parts thereof accessible under lock and key for inspection and repair, and which switch is operable from the instrument board, and capable of being locked in the open and parking light-closing positions by a lock, preferably using the same key as the previously mentioned lock.

A further object of the invention is the provision of means whereby the battery on the vehicle may be prevented from being discharged while the vehicle is not in use.

A further object of the invention is the provision of means to prevent unauthorized use of the vehicle by straight wiring.

The more specific objects and advantages will become apparent from a consideration of the description following taken in connection with accompanying drawing illustrating an operative embodiment.

In said drawing:—

Figure 1 is a view in elevation of our improvements, shown as applied to fragments of a dashboard and instrument board of a motor vehicle;

Figure 2 is an enlarged vertical sectional view taken through the switch and instrument board;

Figure 3 is a sectional view taken on the line 3—3 of Figure 2;

Figure 4 is a sectional view taken on the line 4—4 of Figure 1; and

Figure 5 is a sectional view taken on the line 5—5 of Figure 4.

Referring specifically to the drawing, wherein like reference characters designate like or similar parts, 10 designates the dashboard and 11 the instrument board of a conventional automobile or self-propelled vehicle.

A switch casing 12 is bolted as at 13 to the dashboard 10, preferably with a sheet of insulation 14 disposed therebetween. A switch box proper 15 is located within the casing 12 and the bolts 13 pass through a flange 16 thereof to secure it in place. Secured to the forward wall of the box 15 is a block of insulation 17 against which resilient U-shape contacts 18 and 19 are fastened as by means of bolts or binding posts 20 and 21, respectively. The said contacts 18 and 19 are adapted to be simultaneously closed by a switch arm 22 fastened to a conducting bracket 23 by a pivot 24 and which bracket is secured to the block 17 by means of a bolt or binding post 25. When the switch arm 22 engages the contacts 18 and 19, as suggested by the dotted line in Figure 2, all of the circuits of the automobile or self-propelled vehicle are capable of closing, since binding posts 20, 21, and 25, are by means of conductors 26, 27 and 28, connected in the conventional manner with the battery and parts of the car or automobile receiving electric current therefrom.

In the event the operator of the automobile or vehicle equipped with the improvements leaves the same, unauthorized use is prevented, since the switch blade 22 is moved to open position, that is, the full line position of Figure 2, disengaging the contacts 18 and 19. Or if desired, the switch 22 may be moved into a position engaging contact 19 only and thus enabling the circuit of the automobile to be closed only through the parking light of the vehicle, in whose circuit the contact 19, binding post 21, and conductor 27 are connected.

A push and pull rod 29 operates the switch blade 22, being connected at one end to a section 30 of insulation, passing through openings 31 in the dashboard, and insulation 14, and pivoted as at 32 to the blade 22. Rod 29 also slides through the instrument board 11 as shown adjacent a conventional lock 33 secured to such instrument board. Said rod 29 has a pair of opposite notches at 34, and another pair thereof at 35. The lock 33 is conventional, being key-operated preferably, and has a sliding bolt 36 bifurcated as shown so as to engage the notches 34 to hold the switch 22 in open position, or engage the notches 35 to hold the switch 22 in engagement with the contact 19 only, so that the parking lamp circuit may be closed. When the bolt disengages the notches 34 and 35, the rod 29 may be moved fully forwardly, placing the blade 22 in closing relation with both of the contacts 18 and 19. A knob 37 is provided on the free end of the rod 29 to facilitate its operation.

In order that the parts within the casing 12 may be inspected and repaired without disconnecting the device, the front wall of the casing 12 is preferably in the form of a door 38 hinged at its bottom at 39 on a horizontal axis so as to swing outwardly and downwardly. This door 38 is normally held in closed position by a conventional lock mechanism as at 40 and which lock mechanism is preferably operable by the same key which operates the lock 33.

Various changes may be resorted to provided they fall within the spirit and scope of the invention.

What is claimed is:

A device of the class described having a switch provided with a contact and with a blade member, a casing in which said contact and blade member are disposed, means at one end of the casing for attachment thereof to a support to mount the casing with the other end free, a tubular casing of insulation surrounding the first mentioned casing and extending beyond the latter end of the first mentioned casing, a block of insulation carried by the first mentioned casing mounting said contact and blade, a door closing one end of the tubular casing accessible at the free end of the first mentioned casing, lock means normally securing said door closed, said door being on the extended portion of the casing, a support engaged by said means, a sheet of insulation between the said first mentioned casing and support, said sheet and support having slots therein and operating means engaging the blade member and extending through said slots.

JOHN ABNER BARKER.
ROBERT LEE DEW.